(12) United States Patent
Prasad et al.

(10) Patent No.: US 7,062,470 B2
(45) Date of Patent: Jun. 13, 2006

(54) TRANSACTION SIGNATURE

(75) Inventors: Bhavani Prasad, Reno, NV (US); Marc Espin, Sparks, NV (US); Richard E. Rowe, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/378,020

(22) Filed: Feb. 27, 2003

(65) Prior Publication Data
US 2003/0144965 A1 Jul. 31, 2003

Related U.S. Application Data

(63) Continuation of application No. 09/660,984, filed on Sep. 13, 2000, now Pat. No. 6,675,152.

(51) Int. Cl.
G06F 17/00 (2006.01)
(52) U.S. Cl. .................. 705/64; 705/65; 713/176
(58) Field of Classification Search .............. 705/1, 705/64, 65; 463/25, 29, 40, 42, 43; 713/200–202, 713/176, 177
See application file for complete search history.

(56) References Cited

U.S. PATENT DOCUMENTS

| 5,643,086 | A |   | 7/1997  | Alcorn et al. ............ 463/29    |
| 6,012,832 | A |   | 1/2000  | Saunders et al. ......... 364/410    |
| 6,018,717 | A | * | 1/2000  | Lee et al. ................. 705/13   |
| 6,048,269 | A |   | 4/2000  | Burns et al. ............. 463/25    |
| 6,117,011 | A | * | 9/2000  | Lvov ...................... 463/25    |
| 6,153,835 | A | * | 11/2000 | Schwartz et al. ....... 177/25.13   |
| 6,203,427 | B1 |  | 3/2001  | Walker et al. ........... 463/16    |
| 6,466,670 | B1 |  | 10/2002 | Tsuria et al. ............ 380/202   |

FOREIGN PATENT DOCUMENTS

| EP | 055565 A1      | 8/1993  |
| GB | 2121569 A      | 12/1983 |
| WO | WO98/26537     | 6/1998  |
| WO | WO98/47113     | 10/1998 |
| WO | WO99/65579     | 12/1999 |
| WO | WO009965579 A1 * | 12/1999 |

OTHER PUBLICATIONS

IBM Technical Disclosure Bulletin; Title: Architecture for a video Arcade Game network; Apr. 1991; vol. 33.*
International Game Technology Brochure, entitled EZ Pay Ticket System Game King Series, copyrighted 2000.
International Game Technology Brochure, entitled EZ Pay Ticket System CVT Hardware, copyrighted 2000.
International Game Technology Brochure, entitled EZ Pay Ticket System Overview, copyrighted 2000.
International Game Technology Brochure, entitled EZ Pay Ticket System Operations Support, copyrighted 2000.

* cited by examiner

Primary Examiner—Elisca Pierre Eddy
(74) Attorney, Agent, or Firm—Beyer Weaver & Thomas LLP

(57) ABSTRACT

The present invention provides systems and methods for protecting transaction information stored in a database of a gaming network. To accomplish this, a transaction signature is generated each time the user completes a transaction on a gaming machine. The transaction signature is generated using transaction information from a particular transaction. The transaction signature and transaction information are stored together in a network database. Upon subsequent access to the transaction information in the database, the transaction signature for the transaction information is recalculated based on the transaction information at that time. The new transaction signature is then compared to the transaction signature previously stored. Any differences between the two transaction signatures may be used to signal unauthorized alteration in the database transaction information.

54 Claims, 5 Drawing Sheets

| Validation Number (Primary Key) | Print Time | Machine I.D. | Cash-Out Value | Redemption Status | Transaction Signature |
|---|---|---|---|---|---|
| 000001 | 02/08/00 15:32:58 | 0392 | $10.00 | unpaid | x9!03a*o |
| 000002 | 02/12/00 15:33:21 | 0028 | $2.25 | unpaid | p29%gu*sd |
| 000003 | 02/12/00 15:33:25 | 1021 | $1000.00 | paid | iu5%lk09D |
| 000004 | 02/12/00 15:38:43 | 0552 | $30.00 | unpaid | jj!7yh#k$ |
| 000005 | 02/12/00 15:39:03 | 0983 | $5.75 | paid | zre(*2<kl |

FIG. 5

TRANSACTION SIGNATURE

RELATED APPLICATION DATA

The present application claims priority under U.S.C. 120 from U.S. patent application Ser. No. 09/660,984, now U.S. Pat. No. 6,675,152, titled "TRANSACTION SIGNATURE" filed on Sep. 13, 2000, which is incorporated herein by reference.

BACKGROUND OF THE INVENTION

This invention relates to information security for gaming machine networks. More particularly, the present invention relates to protecting gaming machine transaction information stored in a database from unauthorized alteration.

Gaming machines are becoming increasingly sophisticated. Many slot machines now employ CRT video display screens in place of more traditional mechanically-driven reel displays. Further, poker and other games of chance are now commonly provided on electronic/video machines.

To control and monitor gaming machine activity, many establishments employ networks electronically linking numerous gaming machines. Frequently casinos connect their gaming machines to a local area network. Some casinos have even connected multiple local area networks to wide area networks spanning multiple casinos. Such wide area networks allow groups of slot machines at various casinos to be connected to one another for various purposes including use in "progressive" games. Progressive games allow jackpots from multiple machines in multiple locations to grow as one large jackpot.

Transaction currency on gaming machines is also becoming more sophisticated. Where once only coin handling mechanisms were present on gaming machines, credit devices such as cash-out vouchers now find wide use. These credit devices electronically store user transactions and, when used in conjunction with electronic processing systems, they monitor user activity. Some casinos now issue magnetic player identification cards that players use to obtain awards for frequent playing. A player holding such card inserts it in a card reader provided on a gaming machine before he or she begins play. Accounting software on the local area network then detects the card insertion, notes the player identity and follows the machine activity. Other casinos now issue bar-coded tickets. When a player terminates interaction on a gaming machine, the gaming machine prints out a ticket, which includes the player's final status such as the time and a cash-out value. The player then retrieves the ticket and may redeem it for credit at another game or cash it out at a change booth or a pay machine.

As mentioned, gaming transactions are now electronically stored, typically by the gaming machine network. Thus, each time a user completes a transaction on a gaming machine, the network stores the transaction information such as the time, the machine number and credit value of the device at transaction completion. When the user attempts to play another game with the credit device, the network must redeem the value of the device, e.g., for game credit. Similarly, when the user attempts redeem the device for a cash-out, the network must provide the cash value of the device. Upon redemption of the device at a gaming machine or at cash-out, the redemption value of the device is determined according to the user's last stored transaction in the network.

Transaction information for the network is typically stored in a common location or database for consistent access by the gaming machines and casino personnel. Some casinos use conventional database management tools to store the transaction information. These database management tools generally permit open access for individuals on the network, e.g., casino personnel. Unfortunately, this open access to the database also potentially allows authorized, and even in some cases unauthorized, individuals to tamper with the transaction information. In one example, an unscrupulous person could alter the transaction amount in a database record from $10 to $100.

From the foregoing, it should be apparent there exists a need for security measures that prevent tampering of transaction information stored in a database of a gaming network.

SUMMARY OF THE INVENTION

The present invention provides systems and methods for protecting transaction information stored in a database of a gaming network. To accomplish this, a transaction signature is generated each time the user completes a transaction on a gaming machine. The transaction signature is generated using transaction information from a particular transaction. The transaction signature and transaction information are stored together in a network database. Upon subsequent access to the transaction information in the database, the transaction signature for the transaction information is recalculated based on the transaction information at that time. The new transaction signature is then compared to the transaction signature previously stored. Any differences between the two transaction signatures may be used to signal unauthorized alteration in the database transaction information.

Generating the transaction signature from the transaction information may be performed by various methods. Typically, this occurs each time the user completes a transaction with a gaming machine. In some embodiments, certain transaction attributes or elements of those attributes are encrypted to generate the transaction signature. The encryption may change over time in order to increase security of the transaction information in the database.

In other embodiments, a portable credit device such as a ticket or card is carried by the player and used during interaction with the gaming machines. Each time the user finishes interaction with a particular gaming machine, the credit device is provided to the player with some of the updated transaction information. The credit device may have a magnetic strip or a semiconductor memory, for example, to store this information. For a ticket, the transaction information may be divided into elements such as a ticket validation number, a ticket amount, a ticket print time and date, a machine identifier, a cluster controller address and a ticket status. One or more of these transaction information elements may be used to generate the transaction signature. The transaction information and transaction signature are stored together in the database.

At a subsequent time, when the transaction information is to be updated or called from the database, the transaction information and transaction signature are verified. This may occur, for example, when the player presents the credit device for redemption at another machine or at cash-out station. At that time, the transaction signature is recalculated based on the current transaction information from the device. This recalculated transaction signature is compared with the stored transaction signature in the database. If the two transaction signatures are consistent, the transaction information may be updated or accessed. At this point, the credit can be redeemed. If the two transaction signatures are inconsistent, the transaction information update or request may be stopped and further investigation may ensue. In addition to verifying the transaction signature, the transaction information may also be compared between the transaction information in the database and transaction information currently available from the device.

These and other features and advantages of the invention will be described in more detail below with reference to the associated figures.

BRIEF DESCRIPTION OF THE DRAWINGS

FIG. 5 illustrates an exemplary database for storing transaction information with transaction signature's in accordance with a specific embodiment of the present invention.

DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

According to the present invention, transaction information stored in a database or other data repository is secured by recording a transaction signature each time the player completes a transaction with a gaming machine. The transaction signature is computed using certain elements of the gaming transaction information. The transaction information and transaction signature are stored together and verified each time the transaction information is accessed. Any inconsistency in the transaction information or transaction signature between the current values and those previously stored may be used to identify a transaction information discrepancy. This ensures that a person, such as someone gaining unauthorized access to the transaction data or even a privileged user, cannot alter the stored transaction information. Thus, it becomes much more difficult to cheat a casino by increasing the amount of credit associated with a transaction.

Figure 1:
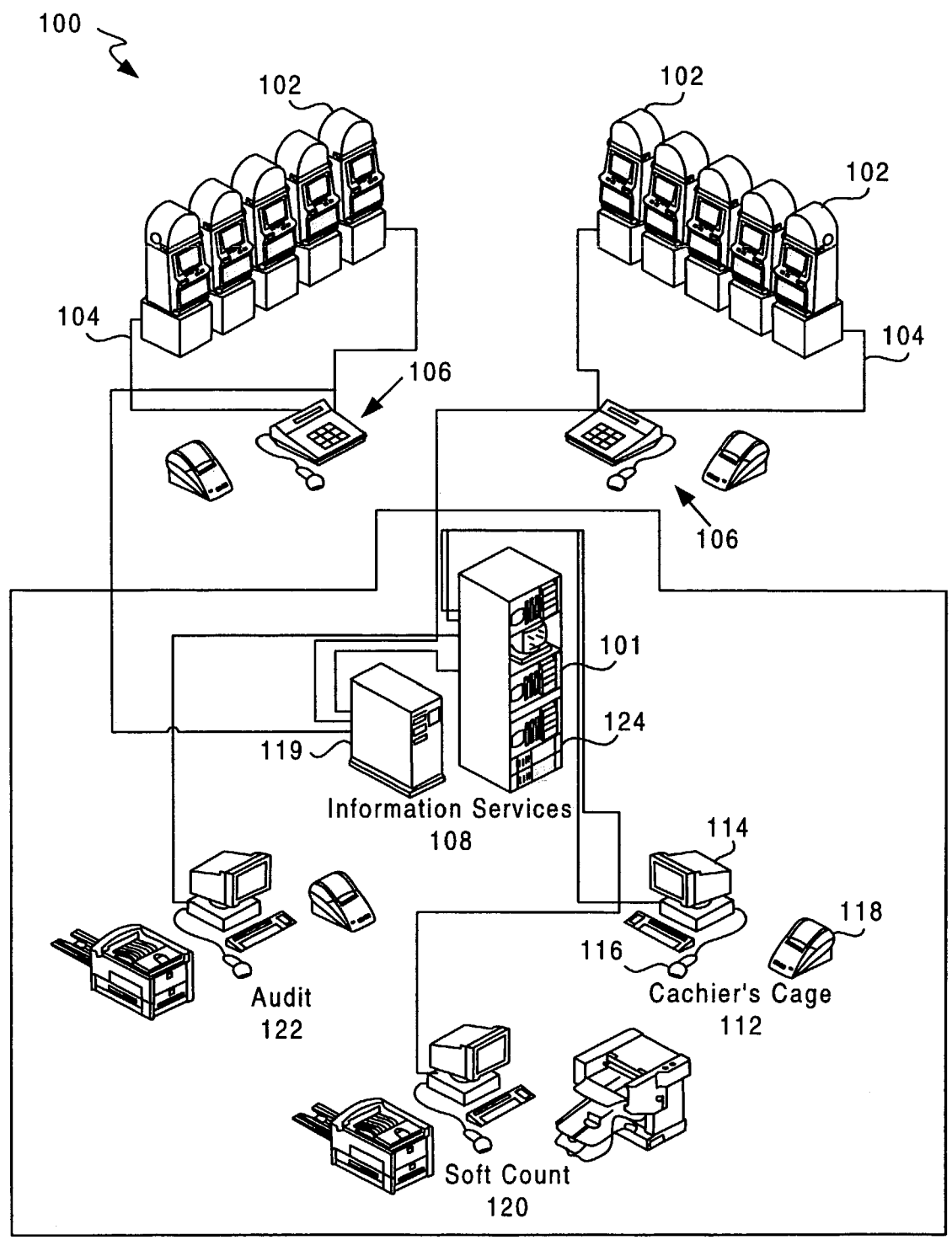
FIG. 1 is a schematic diagram of a gaming machine network allowing electronic transfer of transaction information between a central database and casino gaming machines in accordance with the present invention.

FIG. 1 is a schematic diagram of a gaming machine network 100 that may be used with the present invention. The network 100 includes a number of gaming machines 102. The gaming machines 102 permit a player to enter coins, bills, tickets or any other form of credit to begin a transaction between the player and a gaming machine. Upon completion of a transaction with a gaming machine 102, the player is issued a portable credit device, which will be described below. The gaming machine itself may issue the credit device. The network 100 electronically transfers transaction information between a central database 101 and the gaming machines 102. For this purpose, the network 100 includes lines or cables 104, which may take various forms including coaxial wires, wireless connections or fiber optic cable.

In some embodiments, numerous machines 102 connect to a single cluster controller or a Clerk Validation Terminal (CVT) 106. In one embodiment, a single CVT 106 may accommodate up to 64 machines. The CVT 106 may store transaction information associated with the gaming machines 102. More specifically, the CVT 106 may store credit device information corresponding to the outstanding devices that are waiting for redemption. Any of the machines connected to the CVT 106 will accept credit devices from other gaming machines connected to the same CVT 106. The CVT 106 may also contain additional memory for retaining redundant credit device information. This may be used as a secondary storage medium for credit device information recovery in the event of power failure or memory loss to the main memory in the network 100. In addition, players may redeem credit devices for cash at the CVT 106 at any time.

As there may be many groups of gaming machines 102 in a large casino or other establishment, multiple CVTs 106 may be implemented. The CVTs 106 are connected to a local area network (LAN) 107 which includes a number of computers or workstations as well as terminals, disk drives with fixed and/or removable media, printers and other peripherals connected on a token ring network. The computers on the LAN 107 may provide the casino with various functions such as processing jackpots and fills, exporting of transaction information to the central accounting system, and generating accounting reports and security reports, etc. Other components connected to LAN 107 may include multiplexers, modems, and phone lines to an external system.

The LAN 107 also includes information services components 108. Information services 108 includes a central database 101 and a front end controller 109 which acts as a general controller for the network 100. The controller 109 may continuously poll the various CVTs 106 requesting information pertaining to gaming transactions in the network 100. The CVTs 106 are, in turn, continuously polling the various machines 102. For example, if a credit device has been inserted in a gaming machine 102, that machine will communicate an insertion event to its CVT 106 in response to the next CVT 106 poll. Then when the front end controller 109 polls the CVT 106, the CVT 106 communicates the insertion event to the front end controller 109.

The LAN 107 includes numerous work stations. A cashier's station 112 is included for redemption of credit devices created within the network 100. The cashier's station 112 includes a computer 114 with a printer 118 and a bar-code scanner 116 for reading credit devices. The network 100 may accommodate as many cashier stations 112 as required to support a facility.

Additional stations may be included in the LAN 107. For example, the LAN 107 and may include a station in charge of security and a workstation in charge of surveillance. A soft count station 120 may also be included for daily verification of bills and tickets accepted gaming machines 102 in the network 100. An audit station 122 may also be included for accounting purposes. Any of the stations in the LAN 107 may provide the current status of a credit device. Each of the stations on the LAN 107, including the front end controller 109, may be implemented on any of a variety of commercially available computer systems. Such machines include, but are not limited to, PC compatibles, DEC VAXs, and UNIX machines. In alternative embodiments, the various network functions such as front end control are accomplished by distributed processing. In such cases, the network functions are performed on multiple nodes.

In the depicted example, information services 108 also includes a file server 124 which is the main processor in the network. Its functions will be described in more detail below. A suitable file server machine is the Compaq 550 available from Compaq Computers. The file server communicates with all stations included on the LAN 107 in addition to an external host network through a modem.

As is known to those of skill in the art, EFT hosts are typically mainframe computers which route electronic funds transfer requests and authorizations between various sales or services establishments (a casino in this instance), and remote funds repositories such banks or credit unions. Compaq Computers provides many of the file server computers now used for this purpose. And ACI Company of Omaha, Nebr. provides much of the banking software or "switch processing" software used by most of the major networks around the world. The EFT system may also include workstations, printers, multiplexers, modems, etc. connected as a network and communicating with the casino to the individual card issuing institutions over phone lines.

EFT hosting may be provided by various widely used EFT service providers such as Cirrus™ and Interlink™. Such EFT service providers contract with various card issuing institutions (e.g., banks or other financial institutions) to provide EFT services. In some instances they also contract with one or more very large EFT service providers such as Maestro™ and Interlink™ which together provide EFT services for most of the available funds repositories. Such services are further described in commonly owned United States Patent Application entitled "Cashless Transaction ClearingHouse" filed Aug. 25, 2000, which is incorporated by reference herein for all purposes.

In some embodiments, the EFT host will be provided and maintained by a casino or gaming machine vendor. All EFT requests from gaming machines of the vendor or casino would, in such cases, be routed through the private EFT host. In addition, the host could process ATM, check authorization, and point of sale transactions within the casino. In such embodiments, the casino or gaming machine vendor providing hosting preferably contracts with the large service providers (e.g., Maestro™ and Interlink™), rather than contracting with the smaller providers or the individual funds repositories.

When a user wishes to play a gaming machine 102, he or she inserts credit through a credit acceptor included in the machine. The credit may include cash, coins, game tokens or credit devices such as tickets and magnetic cards. The credit acceptor may be a coin acceptor, bill validator or a similar device which reads tickets or other suitable credit devices. The cash, game tokens or tickets may be stored in the interior of the gaming machine in devices including ticket stackers, drop boxes, and token dispensers. At the start of interaction with the gaming machine, the player may enter player tracking information using a card reader, a keypad, and a florescent display. During the interaction, the player views game information using a video display. Usually, during the course of a game, a player is required to make a number of decisions that affect the outcome of the game. The player makes these choices using a set of player-input switches.

After the player has completed interaction with the gaming machine, the player may receive a portable credit device from the machine which includes any credit resulting from interaction with the gaming machine. By way of example, the portable credit device may be a ticket having a dollar value produced by a printer within the gaming machine. A record of the credit value of the device will be stored in a memory device provided on the network 100 (e.g., a memory device associated with CVT 106 and/or database 101). Any credit on the device may be used for further games on other gaming machines 102. Alternatively, the player may redeem the device at a designated change booth or pay machine.

Having briefly discussed an exemplary gaming system suitable for use with of the present invention, the transaction information protection aspects of the invention, as well as other features and advantages of the present invention, may be better understood with reference to the figures and discussions that follow. As mentioned earlier, the present invention implements a transaction signature to provide transaction information protection.

Figure 2A:
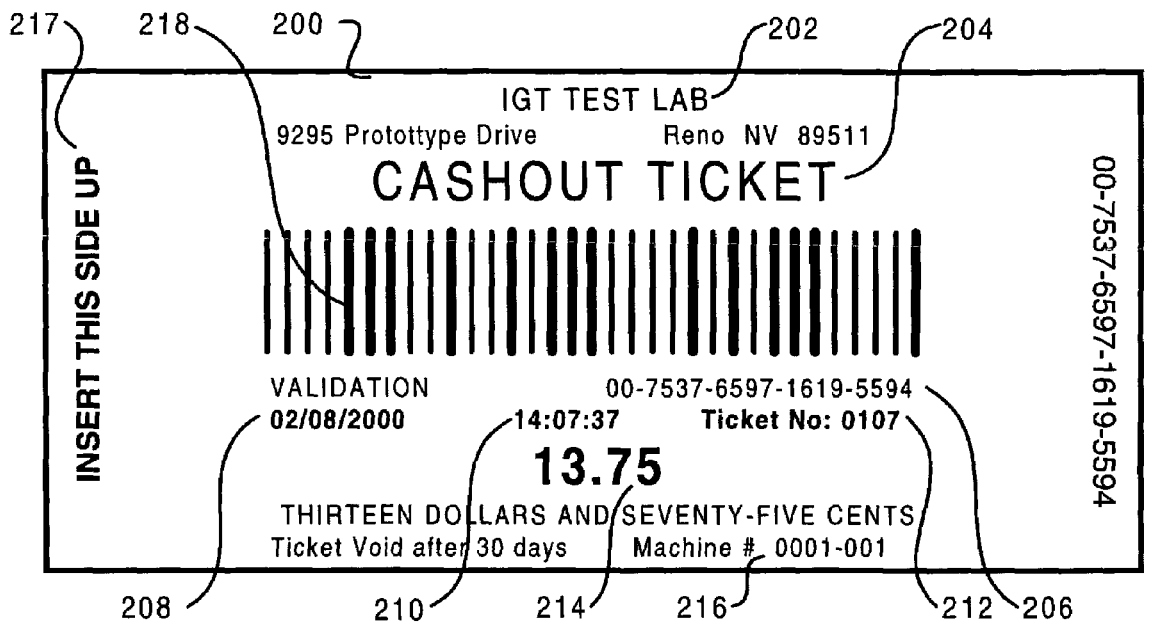
FIG. 2A illustrates an exemplary bar-coded ticket in accordance with one embodiment of the present invention.

In a preferred embodiment of the present invention, a portable credit device is carried by the player. The credit device may be a magnetic card, cash voucher, ticket, or any other form of portable credit device. FIG. 2A illustrates a ticket 200 in accordance with a specific embodiment of the present invention.

The ticket 200 displays one or more transaction information elements. The transaction information elements may include, for example, a casino identification 202, a ticket identification 204, a validation number 206, a date 208, a time 210, a ticket number 212, a value 214, and a machine identification number 216. The validation number 206 is a unique number generated within the network 100 such that each ticket 200 and transaction may be uniquely identified. In one embodiment, the time 210 refers to the time when the ticket 200 is printed. Other transaction information elements not shown which may be stored on the tickets 200 include a cluster controller address, ticket status, status change time and other related information. The ticket 200 may also display other information to assist the player such as instructions 217. The ticket 200 is typically produced each time a player completes a transaction on a gaming machine.

The ticket 200 also includes a bar-code 218. The bar-code 218 stores one or more of the transaction information elements and transaction data in a manner which is readable by gaming machines 102 in the network 100. The bar-code 218 may include any of the transaction information elements listed above. For example, the bar-code 218 may include the validation number 208 for unique identification of the ticket 200 by a gaming machine.

By way of example, the ticket 200 may be a ticket used in the EZPay ticket system. The EZPay ticket system is fully described in commonly owned U.S. patent application Ser. No. 09/544,884 entitled "Wireless Gaming Environment", which is incorporated herein by reference. Although the present invention is primarily discussed with respect to the ticket 200, which the user carries, any suitable portable or transferable credit device capable is suitable for use with the present invention.

As mentioned earlier, the present invention generates a transaction signature to protect transaction information from tampering. The transaction signature is computed using one or more of the transaction information elements (e.g., a combination of casino ID, time, and value). Generating the transaction signature may be performed at various times and from various sources. In a preferred embodiment, a transaction signature is generated by a main processor in conjunction with the network central database each time the user completes a transaction with a gaming machine. In this case, the transaction signature is generated from transaction information elements included in the most recent transaction. The transaction signature may also be generated from other information such as the status of the credit device, the time the ticket was generated, the amount on the ticket, etc. After generation of the transaction signature, the transaction information and transaction signature are stored (preferably in the central database) for subsequent access and verification.

Generally speaking, a transaction refers to interaction of a player with a gaming machine. Typically, the transaction begins when the player inserts credit into the machine. The transaction includes the player participating in one or more games on the machine. Usually, during the course of a game, the player is required to make a number of decisions that affect the outcome of the game. After the player has completed interaction with the gaming machine, the transaction is finished and the player may receive a credit device from the machine which includes any credit resulting from interaction with the gaming machine.

The transaction information used for generating the signature may vary. Broadly speaking, the transaction information used in generating the transaction signature may include any data or information related to a transaction between a player and a gaming machine. The transaction information used for generating the transaction signature need not be characteristic or unique by itself, but may be processed to provide a characteristic transaction signature. A characteristic transaction signature refers to a transaction signature which is substantially unique within a database. In some embodiments, the transaction information used for generating the signature may include the user's identification (e.g., name or number), transaction termination time, a machine identifier, casino identification, final transaction value, ticket validation number, ticket printer time, machine identifier, cluster controller address, ticket status, or some combination thereof.

Any technique for generating the transaction signature from the chosen transaction information (the seed value(s)) may be employed. Preferably, it is a technique that cannot be readily discerned from the other information stored with the signature (e.g., other information in a database record). In some embodiments, a specific algorithm is used to translate the transaction information into the transaction signature. The resulting transaction signature produced by the algorithm may take the form of a string of characters. The string of characters may include computer-generated symbols such as numbers, letters, symbols, etc. For simplicity, the transaction signature is preferably provided "in the clear"; i.e., without encryption of the string of characters. In another embodiment, the string of characters may be encrypted to improve protection. As one skilled in the art would appreciate, there exists an abundant number of ways to create an encrypted key from the transaction information and the present invention may include any such encryption algorithm or mechanism.

In other embodiments, the algorithm used to produce the transaction signature may vary over time to improve transaction information protection. By way of example, the algorithm may change every week. In one embodiment, the information used in generating the signature the may change. For example, in one week, the transaction information used for generating the signature of a ticket may include the user's name, the ticket print time and a machine identifier. The next week, the transaction information used for generating the signature may include the user's name, the gaming machine identifier and the final transaction value on the gaming machine. In addition, the order of transaction information elements used to generate the transaction signature may also change to vary the algorithm and transaction signature.

One exemplary algorithm for creating transaction signatures suitable for use with the present invention is a cyclic redundancy check (CRC) algorithm. To vary this CRC algorithm over time, the order of transaction information elements provided to the algorithm may vary as well as altering the initial seed value to the algorithm. Specific algorithms suitable for use with the present invention include the CRC-16 algorithm and the CRC-32 algorithm. As one skilled in the art would appreciate, there exists an abundant number of algorithms to create an encrypted key from the transaction information and the present invention may include any such algorithm.

Figure 2B:
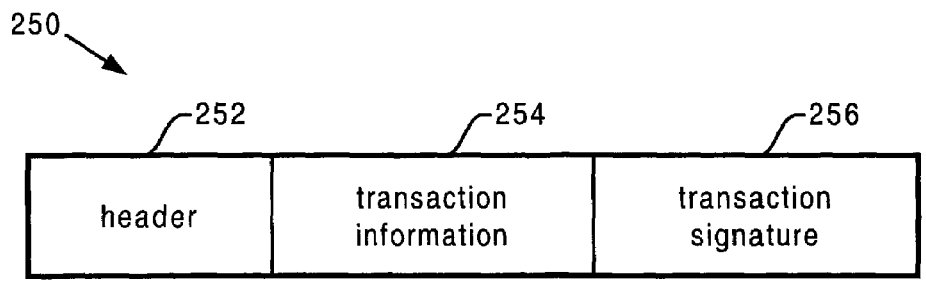
FIG. 2B illustrates an exemplary portion of code containing the transaction information and a transaction signature in accordance with a specific embodiment of the present invention.

As mentioned, the transaction information and transaction signature are recorded electronically in a memory device within the network 100. FIG. 2B illustrates an exemplary data structure 250 containing the transaction data and a transaction signature in accordance with a specific embodiment of the present invention. The data structure 250 includes a header portion 252 used for transmission within the network 100. A transaction information portion 254 contains some or all of the transaction information. This may include the transaction time, validation number, ticket amount, etc. A transaction signature portion 256 contains the transaction signature corresponding to the transaction information contained in the transaction information portion 254. In one embodiment, the data structure 250 is included in a network packet sent over a network from a central database to a gaming machine. This may occur, for example, when the gaming machine requests validation of a ticket from the central database.

Figure 3:
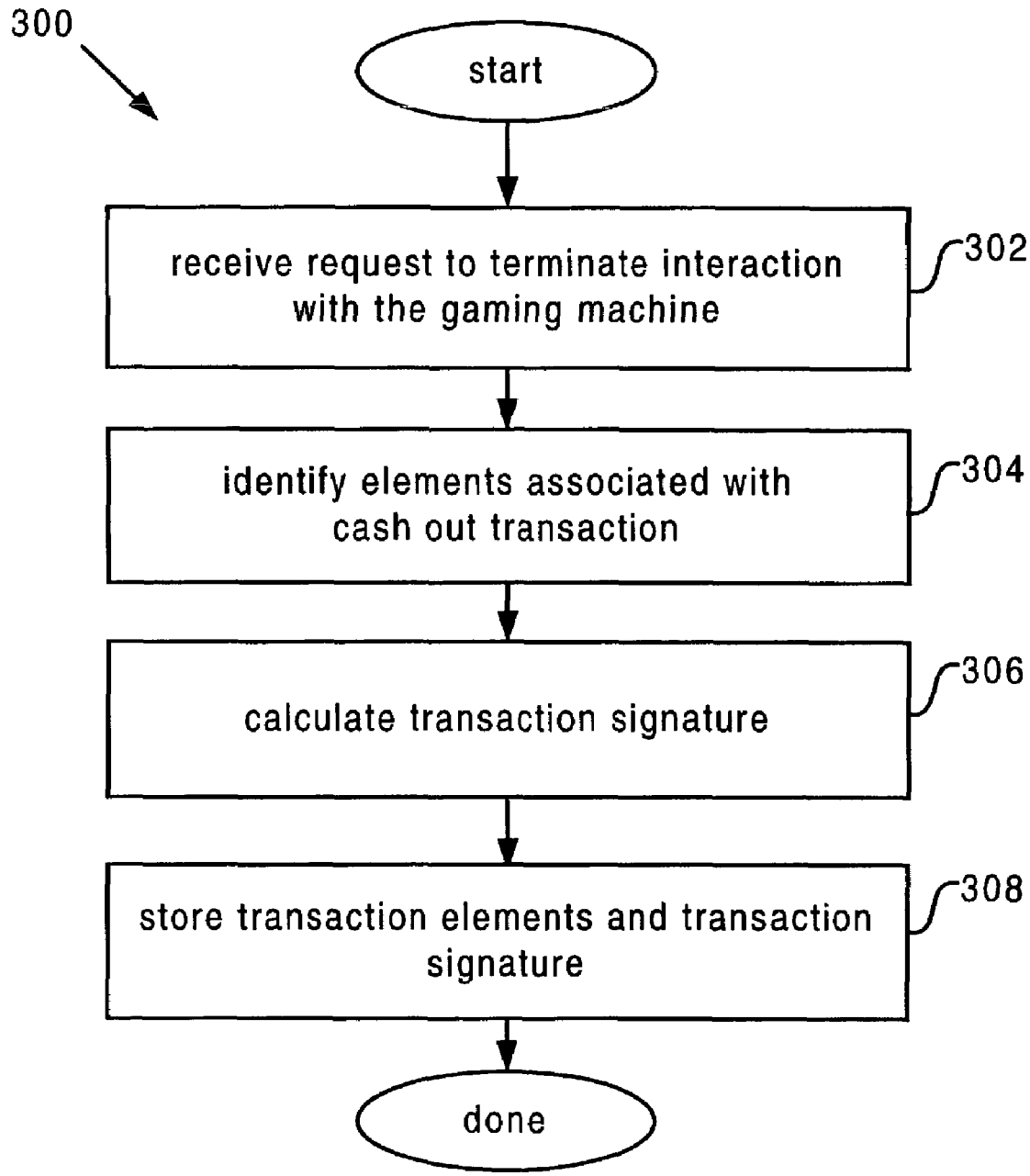
FIG. 3 illustrates a process flow to generate a transaction signature in accordance with one embodiment of the present invention.

FIG. 3 illustrates a process flow 300 to record a transaction signature after a player completes one or more games on a playing machine in accordance with one embodiment of the present invention. Processes in accordance with the present invention may include up to several additional steps not described or illustrated here in order not to obscure the present invention.

The process flow 300 begins with a request to finish interaction with a gaming machine (302). At this point, a processor within the machine may calculate one or more transaction elements associated with the transaction, e.g., the time and cash out value. The cash out value after interaction with the gaming machine may include winnings from the gaming machine. The transaction elements are then sent to a central processor for the network which is coupled to a central database. The central processor then identifies one or more transaction information elements associated with the cash out transaction (304). These elements are then used to calculate a transaction signature for the transaction (306).

The transaction information and transaction signature may then be stored (308). In one embodiment, the transaction information and transaction signature are recorded in the central database of the gaming network. In addition, the transaction information and transaction signature may also be recorded in additional memory locations such as those found in a cluster controller or CVT, for example. The transaction information and transaction signature may be stored in various ways. In one embodiment, the transaction information and transaction signature are stored together as a new record in a database after each transaction. In another embodiment where transaction information is updated in a progressive record, each time transaction information is updated in the database, an updated transaction signature is automatically attached to the transaction information. In this manner, the most recent transaction signature is verified whenever the transaction information is accessed.

Upon subsequent access to the transaction information, either for redemption by a gaming machine or at cash-out, the transaction signature is verified. Verifying the transaction signature includes verification between the transaction signature stored in the database and a transaction signature calculated based on the transaction information at the time of access. The transaction information used at the time of access may include transaction information obtained from a credit device used with a gaming machine. Any discrepancies between the current calculated transaction signature the transaction signature stored in the database may be investigated. In this manner, any alteration to the transaction information in the database may be detected. In some embodiments, the transaction information may additionally be verified upon subsequent access to the transaction information. Verifying the transaction information may include verification between the transaction information stored in the database and the transaction information at the time of access by a credit device in a gaming machine, for example.

In one embodiment, a transaction signature is verified each time transaction information related to the transaction signature is updated and each time the transaction information is accessed, e.g., for redemption at a cashier's station. Note that this need not be associated with a credit transaction such as redemption. It may also occur at random times, when triggered by a database integrity check, for example. In one embodiment, when credit devices are to be redeemed, only credit devices with valid transaction signatures are allowed redemption. In another embodiment, when transaction information is retrieved from the database to be sent to a CVT, a cashier's station or a gaming machine, only transaction information having a valid transaction signature is sent. In either case, a system audit log may be created and maintained that contains the results of requests for transaction information and includes requests which contain requests for transaction information having invalid transaction signatures.

Figure 4:
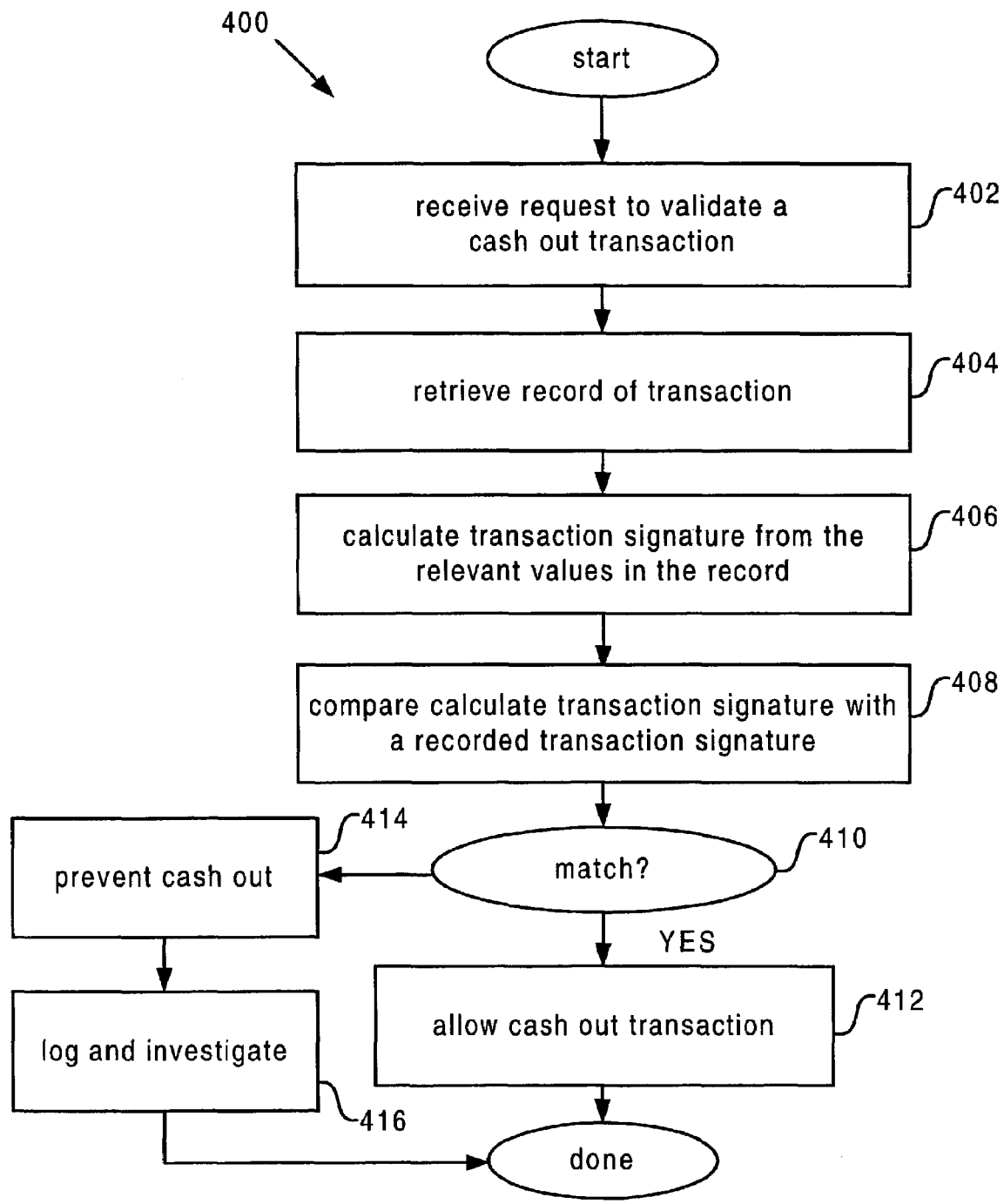
FIG. 4 illustrates a process flow to verify a transaction signature in accordance with one embodiment of the present invention.

FIG. 4 illustrates a process flow 400 for validating a transaction signature in accordance with a specific embodiment of the present invention. Processes in accordance with the present invention may include up to several additional steps not described or illustrated here in order not to obscure the present invention.

As mentioned before, according to one embodiment, a player may carry a credit device for use with gaming machines of a gaming machine network. The player may redeem the credit device and any value on the credit device at any gaming machine, a designated cash out window or a pay machine. When a credit device is redeemed at a cash out window, the cashier may verify the device by inputting the device number into the cashier station computer. In one embodiment where the credit device is a ticket including a bar-code, the cashier may input the ticket identification by scanning the ticket with a bar-code scanner. The most recent ticket transaction information and transaction signature will be stored in a central database of the system. Thus, upon receiving a request to validate a cash out transaction (402), the system will retrieve a record of the transaction (404). The record of the transaction will include a transaction signature and any transaction information stored in the central database.

The process flow 400 then calculates the transaction signature from the relevant transaction information elements in the database record (406). The process flow 400 compares the calculated transaction signature with the transaction signature recorded in the database (408). In addition, the process flow 400 may also compare one or more of the transaction information elements for consistency between the database and the credit device.

If the calculated transaction signature (from 406) matches the transaction signature recorded in the database (410), validation of the cash out transaction is allowed (412). If the validation request occurs at a gaming machine, the player will be credited the corresponding amount on the gaming machine. If the validation request occurs at a cashier's station, the player will be paid with the corresponding amount according to the cash out value stored in the database. The system may also print out a verification receipt for each ticket at the cashier's station. The cashier may store the ticket and the verification receipt. If the calculated transaction signature (from 406) does not match the transaction signature recorded in the database (410), the cash out transaction is prevented (414), the discrepancy may be logged and investigated (416).

In one embodiment, the transaction signature and/or transaction information in the database are verified each time the validation number is accessed, each time the transaction information is updated, and each time credit associated with the validation number is to be redeemed. In some embodiments, the transaction information may be verified using a comparison between the stored transaction signature and a newly calculated transaction signature based on transaction information not in the database. In this case, the new transaction signature is generated using transaction information from an alternate source outside the database at the time of access. By way of example, the alternate source may be the credit device used by the player. Again, if the two transaction signatures are different, the transaction information may have been altered and the discrepancy is logged and investigated.

In one embodiment, the network 100 may perform periodic validation of the transaction information in the database. In a specific embodiment, the network 100 performs periodic validation by comparing transaction signatures locally stored in the CVTs 106 with transaction signatures stored in the database. Any discrepancies between transaction signature stored in CVT's 106 and those in database may elicit further investigation.

The transaction information and transaction signature are stored within a database. The database may be centralized to the entire system or a database may included local to a CVT for a certain number of gaming machines. Any conventional database tool is suitable for use with the present invention. By way of example, a DBA or SQL database are both suitable for use with the present invention.

FIG. 5 presents a logical representation of a database 500 for storing transaction information with a transaction signature in accordance with a specific embodiment of this invention. The database 500 includes a number of records 501 each relating to an individual transaction. A primary key 502 uniquely identifies each record 501. In one embodiment, the primary key 502 is the validation number 206 produced by a gaming machine at cash out of the credit device. Each record 501 may also include a number of transaction information elements such as a print time 504, a machine ID 506, a cashier value validation and a redemption status 510. A transaction signature 512 is also included in each record 501. The database 500 may also include numerous other transaction information elements such as the machine number, the cluster controller number, or any other elements stored on the ticket 200.

In one embodiment, the transaction signature is generated and appended to the transaction information in the database whenever the transaction information is updated. In this manner, a transaction signature is attached to the transaction information in the database based on the most recent transaction information.

Advantageously, the present invention prevents unauthorized tampering of transaction information stored in a database of a gaming network. Correspondingly, the transaction information stored in the database may be kept "in the clear". In other words, the transaction information may be kept in the database without encryption which may encumber transmission and thereby decrease performance of the network. The above-mentioned recording and verification of transaction signatures also prevents anyone with a standard database tool to create new tickets in the system database and attempt to redeem such tickets at a cashier terminal, a cluster controller or machine in the network.

Although the foregoing invention has been described in some detail for purposes of clarity of understanding, it will be apparent that certain changes and modifications may be practiced within the scope of the appended claims. For instance, while the methods and systems of this invention have been described primarily in reference to protecting the cash out value of the transaction information, the invention is not limited to protecting just this element of the transaction information. Indeed, the transaction information protected by the present invention may include any of the transaction information elements stored in the database such as the ticket identification, the time, the validation number, etc. Therefore, the present examples are to be considered as illustrative and not restrictive, and the invention is not to be limited to the details given herein, but may be modified within the scope of the appended claims.

What is claimed is:

1. A method of protecting transaction information stored in a database associated with gaming machines, the method comprising:
  receiving a plurality of transaction information elements for a cashless instrument transaction from a gaming machine wherein said plurality of transaction information elements are at least for describing a value associated with the cashless instrument transaction
  generating a first transaction signature from at least one of the plurality of transaction information elements;
  recording the plurality of transaction information elements and the first transaction signature in the database wherein a portion of the transaction information elements are also stored on a cashless instrument separate from the database;
  generating a second transaction signature upon a request to access the recorded plurality of transaction information elements, wherein the second transaction signature is generated from at least one of the plurality of transaction information elements recorded in the database as it exists when the request is made; and
  verifying the contents of the database by comparing the first transaction signature, generated when the plurality of transaction elements are recorded in the database, with the second transaction signature, generated after the request is made to access the recorded plurality of transaction elements, to determine whether the contents of the database have been altered.

2. The method of claim 1, further comprising sending at least one of the plurality of transaction information elements from the database when the contents of the database are verified.

3. The method of claim 2, wherein the at least one of the plurality of transaction information elements that are sent are used to redeem a credit device.

4. The method of claim 1, further comprising allowing redemption of a credit device associated with the cashless instrument transaction when the contents of the database are verified.

5. The method of claim 1, further comprising denying redemption of a credit device associated with the cashless instrument transaction when the contents of the database are not verified.

6. The method of claim 1, further comprising receiving a transaction information element stored on a credit device and comparing a the transaction information element stored on a the credit device with one of the plurality of transaction information elements stored in the database.

7. The method of claim 6, further comprising denying access to the plurality of transaction information elements if the transaction information element stored on the credit device is inconsistent with the plurality of transaction information elements stored in the database.

8. The method of claim 1, wherein the request to access the recorded plurality of transaction information elements is made pursuant to a request to redeem a credit device for credits at a gaming machine.

9. The method of claim 1, wherein the request to access the recorded plurality of transaction information elements is made pursuant to a request to redeem a credit device for cash.

10. The method of claim 1, wherein the first transaction signature is updated when a valid change is made to the plurality of transaction information elements, and wherein the updated first transaction signature is recorded with the changed plurality of transaction information elements.

11. The method of claim 10, wherein the changed plurality of transaction information elements is recorded as a new record in the database, and wherein the updated first transaction signature is recorded with the new record.

12. The method of claim 10, wherein the changed plurality of transaction information elements is recorded as an updated version of a previously stored record, and wherein the updated first transaction signature is recorded as an updated version of a previously stored first transaction signature.

13. The method of claim 1, wherein the request to access the recorded plurality of transaction information elements is made pursuant to a periodic validation of the database or a database integrity check.

14. The method of claim 1, wherein the first and second transaction signatures are generated by applying an algorithm to at least one of the plurality of transaction information elements recorded in the database, and wherein the algorithm changes over time and wherein the algorithm is changed by using at least one different transaction information element to generate the first and the second transaction signatures.

15. The method of claim 1, wherein the first and second transaction signatures are generated by applying an algorithm to at least one of the plurality of transaction information elements recorded in the database, and wherein the algorithm changes over time and wherein the algorithm is changed by using a different ordering of transaction information elements to generate the first and the second transaction signatures.

16. The method of claim 1, wherein the plurality of transaction information elements is recorded without using any encryption.

17. The method of claim 1, wherein the plurality of transaction information elements includes at least one of a ticket identification number, a ticket amount a ticket print time, a machine identification, and a ticket status.

18. The method of claim 1, wherein the request to access the recorded plurality of transaction information elements is made when a credit device associated with the cashless instrument transaction is presented at a second gaming machine, and wherein the gaming machine and second gaming machine are connected via a network.

19. The method of claim 1, wherein the request to access the recorded plurality of transaction information elements is made when a credit device associated with the cashless instrument transaction is presented at the gaming machine.

20. The method of claim 1, wherein the first and second transaction signatures are generated by applying an algorithm to at least one of the plurality of transaction information elements recorded in the database, and wherein the algorithm changes over time.

21. A method of protecting transaction information stored in a database associated with gaming machines, the method comprising:
receiving a plurality of transaction information elements for a cashless instrument transaction from a gaming machine wherein said transaction information elements are at least for describing a value associated with the cashless instrument transaction;
generating a first transaction signature from at least one of the plurality of transaction information elements;
recording the plurality of transaction information elements and the first transaction signature in the database wherein a portion of the plurality of transaction information elements are also stored on a credit device separate from the database;
upon a request to redeem the credit device, accessing the recorded plurality of transaction information elements;
generating a second transaction signature from the plurality of transaction information elements recorded on the credit device; and
comparing the first transaction signature, generated when the plurality of transaction elements are recorded in the database, with the second transaction signature, generated after the request to redeem the credit device, to determine whether the contents of the database have been altered.

22. The method of claim 21, further comprising sending at least one of the plurality of transaction information elements from the database if the first transaction signature is consistent with the second transaction signature.

23. The method of claim 22, wherein the at least one of the plurality of transaction information that are sent is used to redeem the credit device.

24. The method of claim 21, further comprising allowing a redemption of the credit device if the first transaction signature is consistent with the second transaction signature.

25. The method of claim 21, further comprising denying a redemption of the credit device if the first transaction signature is inconsistent with the second transaction signature.

26. The method of claim 21, further comprising comparing a first transaction information element stored on the credit device with one of the plurality of transaction information elements stored in the database.

27. The method of claim 26, further comprising denying access to the plurality of transaction information elements if the first transaction information element stored on the credit device is inconsistent with the plurality of transaction information elements stored in the database.

28. The method of claim 21, wherein the request to redeem the credit device is for redeeming credits at a gaming machine.

29. The method of claim 21, wherein the request to redeem the credit is for redeeming the credit device for cash.

30. The method of claim 21, wherein the first transaction signature is updated when a valid change is made to the plurality of transaction information elements, and wherein the updated first transaction signature and the changed plurality of transaction information elements are recorded in the database.

31. The method of claim 30, wherein the changed plurality of transaction information elements is recorded as a new record in the database, and wherein the updated first transaction signature is recorded with the new record.

32. The method of claim 30, wherein the changed plurality of transaction information elements is recorded as an updated version of a previously stored record, and wherein the updated first transaction signature is recorded as an updated version of the previously stored first transaction signature.

33. The method of claim 21, wherein the first and second transaction signatures are generated by applying an algorithm to at least one of the plurality of transaction information elements recorded in the database, and wherein the algorithm changes over time and wherein the algorithm is changed by using at least one different transaction information element to generate the first and the second transaction signatures.

34. The method of claim 21, wherein the first and second transaction signatures are generated by applying an algorithm to at least one of the plurality of transaction information elements recorded in the database, and wherein the algorithm changes over time and wherein the algorithm is changed by using a different ordering of transaction information elements to generate the first and the second transaction signatures.

35. The method of claim 21, wherein the plurality of transaction information elements is recorded without any encryption.

36. The method of claim 21, wherein the plurality of transaction information elements includes at least one of a ticket identification number, a ticket amount, a ticket print time, a machine identification, and a ticket status.

37. The method of claim 21, wherein the request to access the recorded plurality of transaction information elements is made when the credit device associated with the cashless instrument transaction is presented at a second gaming machine, and wherein the gaming machine and second gaming machine are connected via a network.

38. The method of claim 21, wherein the request to access the recorded plurality of transaction information elements is made when the credit device associated with the cashless instrument transaction is presented at the gaining machine.

39. The method of claim 21, wherein the first and second transaction signatures are generated by applying an algorithm to at least one of the plurality of transaction information elements recorded in the database, and wherein the algorithm changes over time.

40. A method of using a credit device on a gaming machine in a gaming machine network, the method comprising:
- initiating a transaction on the gaming machine to provide a credit device;
- recording a set of transaction information elements related to the transaction;
- generating a transaction signature from one or more of the set of transaction information elements wherein said transaction information elements are at least for describing a value associated with the cashless instrument transaction;
- recording the transaction signature with the set of transaction information elements to a first memory device wherein a portion of the set transaction information elements are stored on the credit device separate from the first memory device;
- providing the credit device
- upon a request to redeem the credit device, generating a second transaction signature from the set of recorded transaction information elements; and
- comparing the transaction signature, generated when the set of transaction elements are recorded, with the second transaction signature, generated alter the request to redeem the credit device, to determine whether the set of recorded transaction information elements have been altered.

41. The method of claim 40 further comprising, prior to initiating the transaction, depositing credits on the gaming machine using at least one of a coin, a game token and a first credit device.

42. The method of claim 40 wherein the set of transaction information elements include at least one of a date, a transaction number and a credit device value.

43. The method of claim 40 wherein the set of transaction information elements and the transaction signature are stored within a database.

44. The method of claim 40 wherein at least one of the set of transaction information elements is stored on the credit device.

45. The method of claim 40 wherein the credit device is a printed ticket.

46. The method of claim 40 further including initiating a second transaction on a second gaming machine in the gaming machine network using the credit device.

47. The method of claim 46 the fitter including verifying the transaction signature before initiating the transaction with the second gaining machine.

48. The method of claim 40, wherein the first and second transaction signatures are generated by applying an algorithm to at least one of the plurality of transaction information elements recorded in the database, and wherein the algorithm changes over time.

49. A cashless instrument transaction server for validating the use of cashless instruments, the cashless instrument transaction server comprising:
- a network interface allowing the cashless instrument transaction server to communicate with a plurality of gaming devices; and
- a database for storing records of cashless instrument transactions generated on the plurality of gaming device;
- a processor configured or designed to i) receive a plurality of transaction information elements for each of the cashless instrument transactions from the plurality of gaming devices wherein said transaction information elements are at least for describing a value associated with each of the cashless instrument transactions; ii) generate a first transaction signature from at least one of the plurality of transaction information elements; iii) record the plurality of transaction information elements and the first transaction signature in the database wherein a portion of the plurality of transaction information elements is also stored on a cashless instrument separate from the database; iv) generate a second transaction signature upon a request to access the recorded plurality of transaction information elements, wherein the second transaction signature is generated from at least one of the plurality of transaction information elements recorded in the database as it exists when the request is made; and v) verifying the contents of the database by comparing the first transaction signature, generated when the plurality of transaction elements are recorded in the database, with the second transaction signature, generated after the request is made to access the recorded plurality of transaction elements to determine whether the contents of the database have been altered.

50. The cashless instrument transaction network of claim 49, wherein the first transaction signature is generated from transaction information elements received from a first gaming device at a first property and the request to access the recorded plurality of transaction information elements is initiated from a second gaming device at a second property.

51. The cashless instrument transaction network of claim 50, wherein the first gaming device or the second gaming device is one of a gaming machine or a device located at a cashier's station.

52. The cashless instrument transaction network of claim 49, wherein the cashless instrument transactions are generated using the cashless instrument.

53. The cashless instrument transaction network of claim 52, wherein the cashless instrument are selected from the group consisting of a smart cart card, a debit card, a bar-coded ticket and an EZ pay ticket voucher.

54. The cashless instrument transaction network of claim 49, wherein the first and second transaction signatures are generated by applying an algorithm to at least one of the plurality of transaction information elements recorded in the database, and wherein the cashless instrument transaction server is adapted for changing the algorithm over time and wherein the cashless instrument transaction server is adapted for changing the algorithm over time.

* * * * *